United States Patent
Pickett et al.

(10) Patent No.: US 7,446,436 B2
(45) Date of Patent: Nov. 4, 2008

(54) WAVEFORM CORRECTION FILTERS

(75) Inventors: Andrew Pickett, Pasadena, CA (US); Theodore Thibault, Reno, NV (US); Edward G. Price, Sandy, UT (US)

(73) Assignee: Environmental Potentials, Inc., Carson City, NV (US)

( * ) Notice: Subject to any disclaimer, the term of this patent is extended or adjusted under 35 U.S.C. 154(b) by 44 days.

(21) Appl. No.: 11/390,649

(22) Filed: Mar. 27, 2006

(65) Prior Publication Data
US 2007/0222299 A1 Sep. 27, 2007

(51) Int. Cl.
*H02J 1/02* (2006.01)
*H02M 1/12* (2006.01)
*H01C 7/108* (2006.01)
*H01C 7/12* (2006.01)
*H02H 1/04* (2006.01)
*H02H 3/20* (2006.01)

(52) U.S. Cl. ................ 307/105; 361/118; 361/119
(58) Field of Classification Search ................ 307/105; 361/118, 119
See application file for complete search history.

(56) References Cited

U.S. PATENT DOCUMENTS

| | | | |
|---|---|---|---|
| 2,526,321 A * | 10/1950 | Beverly | 333/23 |
| 4,327,395 A * | 4/1982 | Yagitani et al. | 361/326 |
| 4,616,286 A * | 10/1986 | Breece | 361/56 |
| 6,137,352 A * | 10/2000 | Germann | 327/601 |
| 6,307,758 B1 * | 10/2001 | Geren | 363/21.15 |
| 6,486,570 B1 | 11/2002 | Price et al. | 307/105 |
| 7,187,012 B2 * | 3/2007 | Walters | 257/106 |

FOREIGN PATENT DOCUMENTS

JP 04297006 A * 10/1992

* cited by examiner

*Primary Examiner*—Stephen W Jackson
*Assistant Examiner*—Hal I Kaplan
(74) *Attorney, Agent, or Firm*—Wagner, Anderson & Bright, LLP

(57) ABSTRACT

A number of wave correction filters are disclosed which respond to power surges or spikes outside the intended frequency and/or voltage for a load device. The circuits respond to such undesired frequencies and voltage levels by sensing and separating them from the desired voltage and frequencies and connecting the energy from such undesired voltages and/or frequencies to resistors where it is dissipated as heat. In this way, the resulting energy is prevented from distorting the input voltage to the load device. It is also retained in the filter and prevented from traveling through a ground connection to pollute other related circuits.

7 Claims, 3 Drawing Sheets

*Fig. 5*
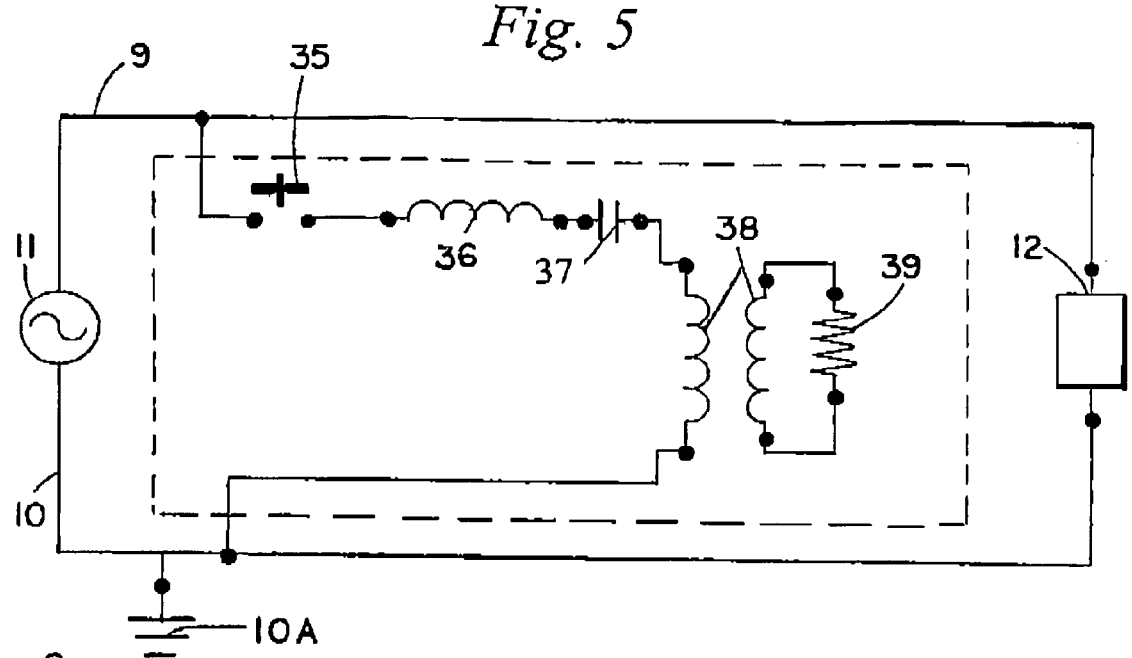
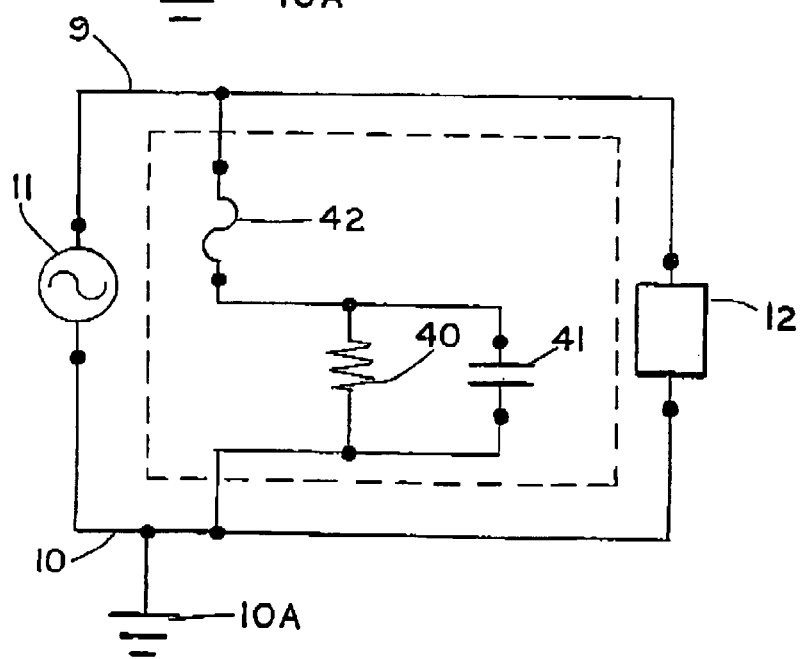
*Fig. 6*

US 7,446,436 B2

WAVEFORM CORRECTION FILTERS

BACKGROUND OF THE INVENTION

For many years, those who are responsible for monitoring usage of significant amounts of alternating current power have been concerned with the quality of such power. Much of the newer equipment now in use is sensitive to transient voltages, such as spikes, power surges, and random radio frequency (r.f.) noise; but at the same time, such equipment may be creating its own transient voltages which it injects back into the power line. When switches turn off and on, reverberating impulses are created on the line. Motors that start and stop cause power impulses known as surges.

Besides random r.f., pollution, electrical machinery of various kinds may generate harmonic frequencies. All of these kinds of power pollution detract from the efficiency of, inter alia, electric motors, generators, and transformers. The waveform of the power supplied to such equipment becomes distorted, resulting in the creation of eddy currents in the ferrous metal parts of such equipment, such as transformer cores and motor stators and rotors. The result is that eddy currents in a motor, for example, dissipate power as heat, thus causing the motor to consume more power to perform the same tasks. The motor may become damaged, either from the effect of excessive heat or from damage to insulation, causing it to break down long before its expected life.

While much has been done to improve that quality of the power being supplied to various consumers, there has been little recognition of the power pollution produced within a single facility as a result of the operation of significant numbers of electric motors, switches, computers, and other power-consuming devices.

Fundamentally, any time an inductive load is switched off, a very high voltage reverberation rising many times higher than the normal peak value of the applied voltage flows back into the power line. A typical transient voltage is shown superimposed on a sine wave in FIG. 1. It will be recognized that the result of the transient voltage is to cause peak voltages at a much higher value and frequency to distort the normal sine wave voltage. The average industrial or commercial circuit receives many daily transients in excess of 1000 volts. These transients reverberate and trigger other oscillations within the network. These reverberations bounce back and forth until they are absorbed or have done damage within the system.

Other disturbances occur when loads are unbalanced in three-phase lines, causing undesirable phase differences between voltage and current. High harmonic neutral currents flow, reacting with transient and surge activity on the line.

From the foregoing, it will be appreciated that the internal power pollution within a network frequently may be a much more serious factor in efficiency of motors, etc., than irregularities in the power supplied from outside the facility.

It has been estimated that up to 60 percent of all electricity is now, or soon will be, passing through non-linear loads. It is such loads that are principal contributors to electric power pollution.

Considerable efficiency gain can be realized if means can be provided that is connected to the individual power lines to such power-consuming units, which can absorb or otherwise remove such transient voltages, thereby preventing them from being injected back into the power line.

Further, in a digital logic control system, where binary bit patterns are used to implement control signals, random impulsive noise can knock out bits or put in bits where they should not exist. Thus, the control signal is altered and the desired action is lost. For this reason, it is important to inhibit the impulsive noise by clamping, filtering, and absorbing such noise before reaching the circuitry that will try to correlate the oncoming binary signal.

The present application constitutes a refinement and an extension of the teaching of U.S. Pat. No. 6,486,570 (common assignee) and describes different waveform correction filters useful with different applications.

It is, therefore, an object of the present invention to provide a waveform correction filter that removes and absorbs random r.f. noise, spikes, surges, and harmonics from the alternating current power supplied to the above-described power-consuming units.

It is another object of the present invention to provide a group of waveform correction filters that will substantially reduce maintenance costs for the associated equipment.

Other objects and advantages will appear from consideration of the following specification taken in connection with the drawings.

BRIEF SUMMARY OF THE INVENTION

The several waveform correction circuits described herein utilize some particular components in what may appear to be conventional filter circuits to provide ways of filtering and absorbing energy from the various transients referred to above rather than permitting it to be reflected back into the associated network. In each case, one or more reactance devices are used, in combination with one or more resistors, to detect alternating voltages outside of a described pass band and to supply the resulting current to resistors where they are absorbed as heat.

In some of the circuits described herein, the waveform correction filter is connected in parallel with an alternating current source and a load device. In these circuits, unless the filter detects voltage outside its pass band, the correction filter has no effect. In one such circuit, when a transient voltage, such as from the surges or spikes referred to above appear across the line, its rise time is initially slowed or extended by an inductor and clamped by a varistor or MOV (Metal Oxide Varistor) at approximately $\sqrt{2}$ times the line voltage. In the case of a 120-volt rms line, this would be about 190 volts. At the instant of clamping, the MOV becomes a very low impedance, and at the same time, a current generator. Because the voltage across the capacitor cannot change at the instant the MOV is switching, the capacitor becomes virtually a short circuit and provides a path for high current to flow.

Connected across the capacitor are a toroidal magnetic core inductor, one or more resistors and a lamp, which may be an LED. The inductor has a highly permeable magnetic core with effectively zero remanence and zero coercivity. The response L of the inductor, with respect to current and frequency, must be linear and must be stable with respect to frequencies ranging up beyond 1 MHz in order to function at its predetermined level through all components of the impinging ringing wave derived from the transient. This requirement is satisfied in the incorporation of the particular magnetic material described.

Another circuit in which the waveform correction filter is connected in parallel with the load utilizes a circuit breaker, an inductor, a capacitor, and a transformer primary winding connected in series with each other. Alternating current disturbances above the desired pass band, which is a selected harmonic of the intended a.c. source, cause the circuit breaker to close, diverting the energy at the harmonic frequency into the waveform correction circuit where it is filtered, stepped up in voltage and dissipated in a resistor connected to the transformer secondary winding.

Another circuit connected in parallel with a load device constitutes a low pass filter having a capacitor connected in parallel with a resistor with frequencies above a desired frequency absorbed in the resistor and dissipated as heat, rather than flowing back into the lines connected to the load or to the ground where such higher frequencies would constitute a disturbance in the overall system.

For loads such a telephones or televisions connected to cable or satellite transmission having two leads, the waveform correction circuits are connected in series/parallel fashion. In the embodiments described herein, the circuits discriminate against frequencies above the normal telephone pass band or above the frequencies of cable or satellite television, for example. In one embodiment, ferrite bead inductors in the leads cooperate with a capacitor and a bi-directional TVSS connected between the leads to provide a low pass filter with the higher frequencies being absorbed in series resistors.

Another circuit utilizes resistors in the leads with diodes and unidirectional TVSS diodes connected with opposite polarity between the leads. The inherent capacitance of the diodes and TVSS diodes comprise low pass filter circuits which separate the higher frequency disturbances that are dissipated as heat in the resistors.

BRIEF DESCRIPTION OF THE DRAWINGS

This invention may be more clearly understood with the following detailed description and by reference to the drawings in which:

FIG. 5 is a schematic drawing of a waveform correction filter of a parallel line connected device operating as a passive low order harmonic filter and absorber;

FIG. 6 is a schematic drawing of a waveform correction filter that functions as a high-frequency filter to attenuate and absorb energy within a specified frequency range.

DESCRIPTION OF THE PREFERRED EMBODIMENTS

Figure 1:
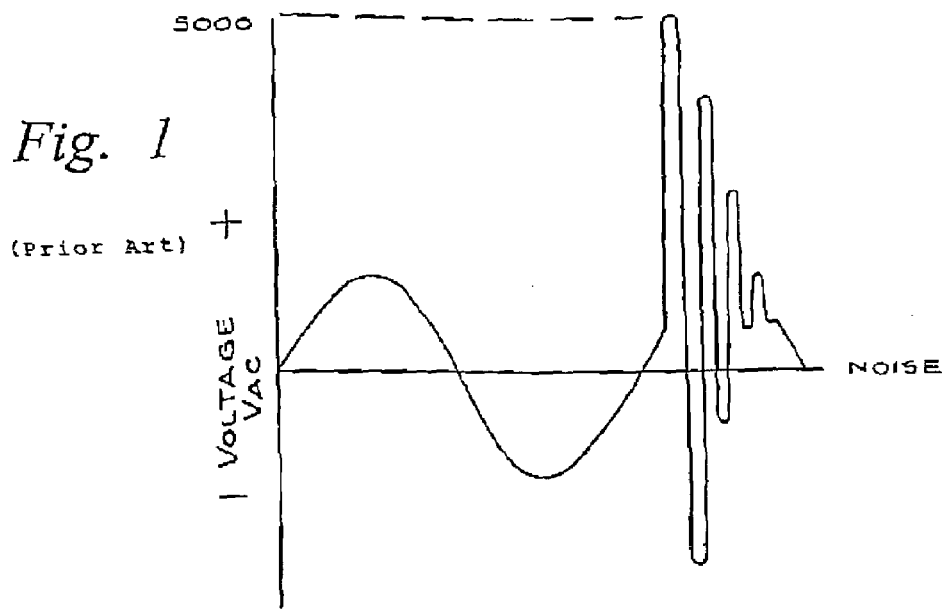
FIG. 1 is a graph showing the distortion of a sinusoidal waveform resulting from a high frequency transient voltage being imposed on it.

FIG. 1, referred to in the "Background of the Invention" above, is a graph showing the distortion of a sinusoidal waveform resulting from a high frequency transient voltage being imposed on it.

Figure 2:
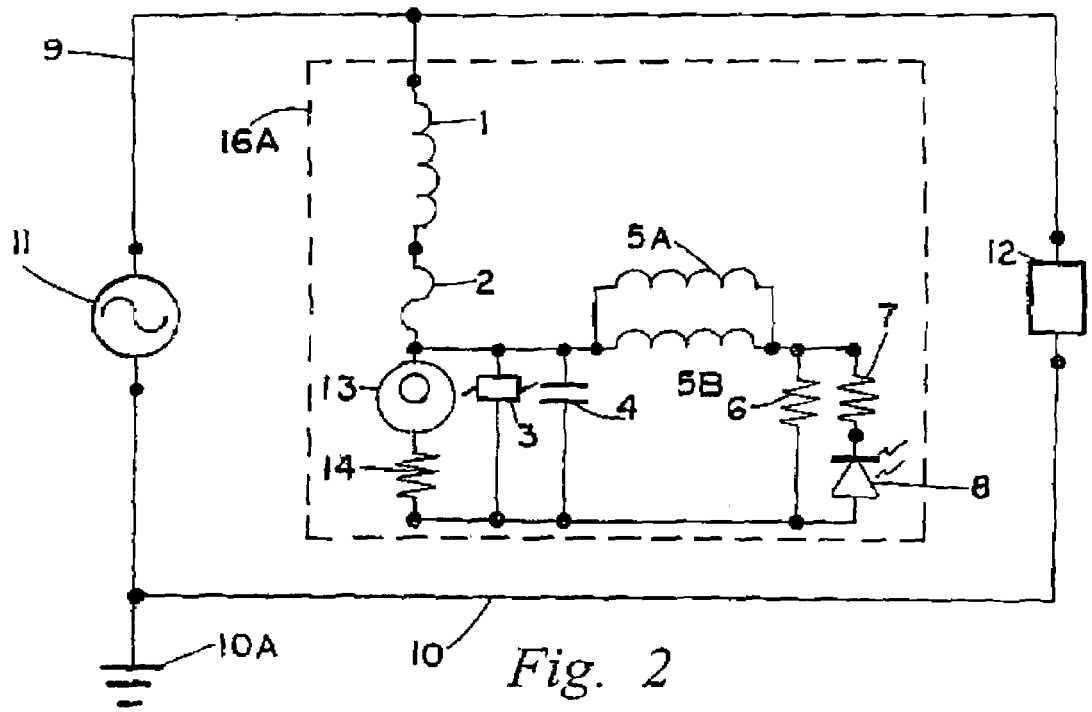
FIG. 2 is a schematic drawing showing a waveform correction filter designed for high current situations according to the invention.

FIG. 2 shows a first embodiment of my invention, which would normally be a three-phase system but which, for simplicity, is shown with a single phase. In this embodiment, as well as others described hereafter, the circuits for the remaining phases are identical to the one shown. This embodiment includes a source, such as an electrical generator 11 connected across a load 12 through lines 9 and 10. Connected in parallel with load 12, between lines 9 and 10, is a filtering circuit 16A.

The component items in this schematic are described functionally as follows:

2 FUSE, protective line type
1 INDUCTOR, ferrite bead
3 VARISTOR, metal oxide
4 CAPACITOR, polypropylene ac rated
5A & 5B MAGNETIC CORES, nanocrystalline toroidal
6 & 7 RESISTOR, carbon type limiting
8 LAMP, neon Circuit 16A includes a ferrite bead inductor 1, a fuse 2, and a MOV or varistor 3. A capacitor 4 is connected in parallel with varistor 3, as are inductors 5A and 5B, in series with a resistor 6. A second resistor 7, in series with an LED lamp 8, is connected in parallel with resistor 6. Also connected in parallel with varistor 3 are a gas tube voltage clamp 13 and a thermistor 14. The gas tube voltage clamp 13 and the thermistor 14 assist varistor 3 in high-current situations. Gas tube voltage clamp 13 is slower in reactance time than varistor 3 but can handle higher energy, as in lightning strikes.

When a surge voltage across lines 9 and 10 exceeds the clamping level of varistor 3, then, because varistor 3 has clamped to a very low resistance, a high current is generated and also accelerated through capacitor 4. Because the voltage across capacitor 4 cannot change instantaneously at the instant of the varistor 3 switching, capacitor 4 becomes virtually a short circuit and provides a path for high current to flow. The rapidly rising current will pass through inductors 5A and 5B, is spread out in time and passed into resistors 6 and 7 and LED 8 where the energy is absorbed as heat.

The MAGNETIC CORES 5A and 5B each include a soft magnetic element having relatively very high initial permeability ($\mu=30,000$), extremely low losses, and high saturation flux density (Bsat=1.2 tesla). This means that the core is very easily magnetized and maintains this condition throughout a wide flux penetration. Thus, the energy that was impressed into the capacitor is now transferred to the "reservoir" of the highly magnetic core. This energy is then processed into the RESISTORS 6 and 7 and the equivalent resistance of the LAMP 8, where over a longer span of time such energy is collected and absorbed.

Ferrite bead inductor 1 will act in a similar manner in spreading the otherwise fast-changing current. The advantage of the above-described system is that it captures the rebounding current of varistor 3 and dissipates the energy in resistors 6 and 7. Details regarding these special resistors appear on pages 11 and 12 below. Otherwise, the surge current would proceed back into lines 9 and 10 and further affect the overall distribution system.

Figure 3:
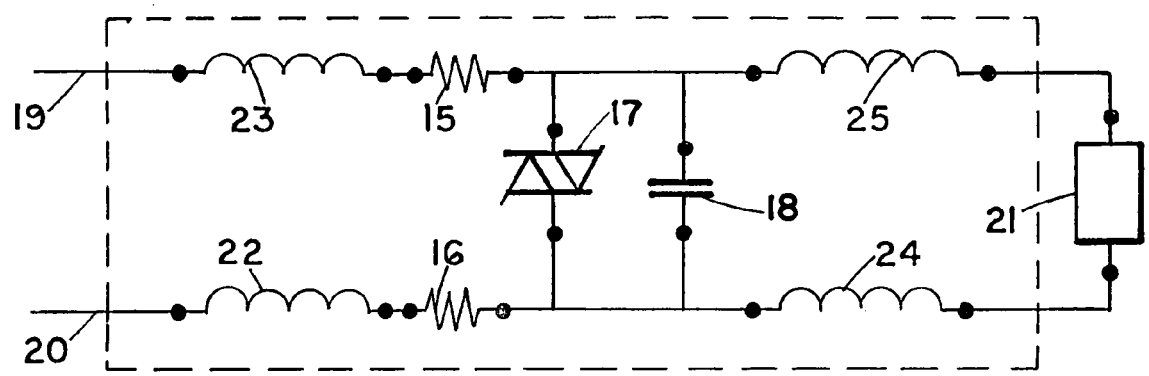
FIG. 3 is a schematic drawing of a waveform correction filter operating in series/parallel between two telephone or DSL communication lines.
Figure 3:
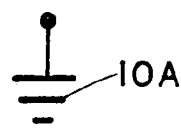

The embodiment of FIG. 3 would normally have two lines but will be described with one line for purposes of simplicity. This embodiment operates in series/parallel between leads 19 and 20, which may be connected to a telephone or to another data system. Ferrite bead inductors 22, 23, 24, and 25 act in conjunction with bi-directional TVSS diode 17, with capacitor 18, and with resistors 15 and 16 to function as a low-pass filter attenuating frequencies higher than that of the telephone voice spectrum. Resistors 15 and 16 are also carbon type as described above. Other resistors described below are all the same carbon type as described in connection with FIG. 2.

Higher frequency disturbance is absorbed and dissipated in resistors 15 and 16. Frequencies higher than the set breakpoint frequency are attenuated as normally expected in a second order filter at 40 dB per decade. Resistors 15 and 16 are placed in series with lines 19 and 20 to absorb and dissipate as much of the over-voltage anomaly as possible. The bi-directional TVSS diode 17 is a fast-acting clamp serving to protect the telephone 21 by shunting the high current into the resistors 15 and 16 at the specified voltage level. Since there is no connection to ground 10A, all of the absorption is contained in the FIG. 3 circuit and not allowed to enter into the facility ground 10A. This also protects telephone 21 from anomalies that arise through spurious ground loops. The filter characteristics of the embodiment of FIG. 3 can be designed to pass higher frequencies to allow DSL communication on the telephone line.

Figure 4:
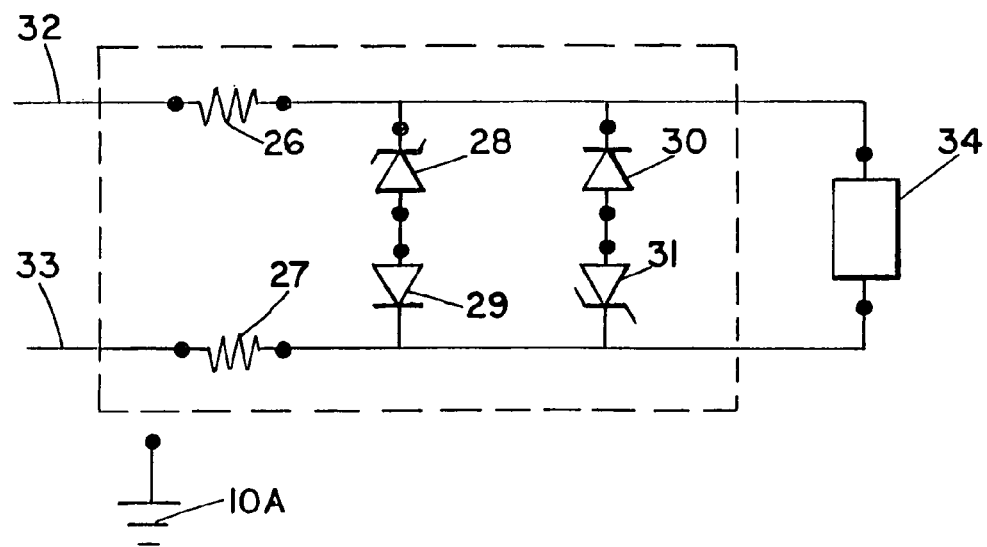
FIG. 4 is a schematic drawing of a waveform correction filter that is connected in parallel between two cable lines or satellite input lines and which is isolated from a system ground.

The embodiment of FIG. 4, which would normally be a three-phase system, is described as a single phase for simplicity and includes two lines 32 and 33 connected to a load device 34, which may be communication equipment. Versions of this embodiment differ in the clamping level between lines due to the difference between cable and satellite transmission. This embodiment of wave correction circuit operates in series/parallel between cable lines 32 and 33.

Resistors 26 and 27 act in conjunction with unidirectional TVSS diodes 28 and 31 and diodes 29 and 30 to act as a low-pass filter attenuating frequencies higher than that of the cable information spectrum. Higher frequency disturbance is absorbed and dissipated in resistors 26 and 27. Frequencies higher than the spectrum used for cable or satellite transmission are attenuated at a rate of 20 dB per decade. The inherent capacitance of the combination of diodes 29 and 30 and unidirectional TVSS diodes 28 and 31 is used in conjunction with resistors 26 and 27 to provide the low-pass filtering in the embodiment of FIG. 4. Resistors 26 and 27 are placed in series with lines 32 and 33 to absorb and dissipate as much of the over-voltage anomaly as possible. The unidirectional TVSS diodes 28 and 31 are a fast-acting clamp serving to protect the equipment 34 by shunting the high current into the resistors 26 and 27 of the specified voltage level of the unit. Since there is no connection to system ground 10A, all of the absorption is contained in the circuit of FIG. 4 and not allowed to enter into the facility ground 10A.

Various versions of FIG. 4 may be modified for a breakpoint frequency and clamping voltage to match that of the communication equipment being protected.

The embodiment of FIG. 5 would normally be a three-phase system but will be described herein with a single phase for purposes of simplicity. Alternating current is supplied from a source 11 to equipment 12, which may be data processing equipment.

The waveform correction circuit of FIG. 5 consists of circuit breaker 35, inductor 36, capacitor 37, transformer 38, and resistor 39 connected across lines 9 and 10. Transformer 38 includes a magnetic core of very low remanence.

The system of FIG. 5 functions as a parallel line connected device and operates as a passive low order harmonic filter and absorber. As a harmonic voltage appears (such as 3rd, 5th, 7th, etc.) between lines 9 and 10, the circuit of FIG. 5 will provide a very low impedance path for the resulting current associated with a given harmonic. The current will be driven by the voltage and will be processed through the resonant combination of inductor 36 and capacitor 37, and further transferred through step-up transformer 38 to be dissipated in resistor 39. Transformer 38 serves to step up the voltage derived from the resonant current input on the primary winding and the harmonic voltage is stepped up sufficiently to pass the energy of the harmonic into resistor 39, where it is dissipated. All other frequencies outside of the band pass of the series resonant circuit composed of inductor 36 and capacitor 37 will be attenuated so that only the targeted harmonic will be allowed to pass through to transformer 38.

Due to the parallel nature of this filter, circuit breaker 35 will actuate upon a fault current and control the let-through of the circuit of FIG. 5. The energy of the harmonic is all absorbed in resistor 39, and no current is delivered to system ground 10A. Because the FIG. 5 embodiment is not a series device, it is system load 12 independent, which affords its use in any system configuration.

As in the case of FIG. 5, the embodiment of FIG. 6 would normally be a three-phase system but is described as a single phase for purposes of simplicity. The circuit of FIG. 6 includes a fuse 42, a special carbon resistor 40 and a capacitor 41 (15 mfd) and functions as a high-frequency filter designed to attenuate signals at 20 dB per decade (120 k Hz-2 MHz). The FIG. 6 circuit is designed to absorb the energy within a specified frequency range in resistor 40 and this energy is totally contained within the circuit of FIG. 6 and not allowed to re-enter lines 9 and 10 through system ground 10A.

While the circuit of FIG. 6 operates as a filter, to perform as described, resistor 40 and capacitor 41 are somewhat special components. Characteristics of resistor 40 are:

Resistance range: 0.010 to 1 Megohm
Power rating: to 50 watts
Nominal voltage: 300 v rms
Temperature range: −55° C. to +155° C.
Thermal resistance: 2 degrees C. per watt
Inductance: <0.1 microhenry
Dielectric strength: 2000 v Capacitor 41 must have a voltage of rating of 600 WVDC and operate in the same temperature environment as does resistor 40. This is a special metallized polypropylene film capacitor whose essential quality is low inductance and low equivalent series resistance up to 100 $KH_z$. Another very important requirement is the $\Delta V/\Delta T$ transfer: 10 volts per microsecond maximum.

The above-described embodiments of the present invention are merely descriptive of its principles and are not to be considered limiting. The scope of the present invention instead shall be determined from the scope of the following claims.

We claim:

1. For use with a power source for supplying an alternating current to a load device, said power source being connected across said load,
   a waveform correction filter connected in parallel with said load device including, in series, an inductor, a voltage clamp, and a thermistor; and
   a capacitor and a MOV, each connected in parallel with said voltage clamp and said thermistor; and
   an inductance device having a highly permeable magnetic core and a resistance device connected in parallel across said voltage clamp and said thermistor such that electrical transients of voltage or frequency substantially above the normal output of said power source result in causing the resistance of said MOV to drop to a low value resulting in a high current being supplied to said inductance device which slows said current and supplies said current to said resistance device.

2. A waveform correction filter as claimed in claim 1 wherein a desired line voltage and frequency are supplied to said load and voltage exceeding the clamping level of said MOV causes said MOV to change to a low-resistance value causing a high current to be generated which passes through said magnetic core inductor, is accelerated through said capacitor, and passed to said resistance devices where the energy of said high current is absorbed in heat.

3. A waveform correction filter as claimed in claim 1 wherein said voltage clamp is connected in parallel with said MOV to protect said MOV from high current flows.

4. A filter as claimed in claim 1 wherein a fuse is connected in series with said inductance device and said MOV.

5. For use with a power source for supplying an alternating current to a load device, said power source being connected across said load,
- a waveform correction circuit connected across said power source comprising, in series:
- a circuit breaker;
- an inductor having a highly permeable magnetic core;
- a capacitor; and
- a transformer having a secondary winding and with a resistance device connected to said secondary winding;
- said circuit operating as a passive low order harmonic filter with current of said low order harmonic voltages being absorbed and dissipated in said resistance device.

6. A waveform correction filter as claimed in claim 5 wherein frequencies outside of a band pass of a series resonant circuit composed of the inductor and the capacitor will be attenuated so that only a targeted harmonic will be allowed to pass through to the transformer.

7. A waveform correction filter as claimed in claim 5 wherein said circuit breaker is activated if a fault current appears on said alternating current connected to said load to cause said fault current to be directed through said waveform correction circuit whereby said fault current is absorbed and dissipated in said resistance device.

* * * * *